United States Patent [19]
Dean

[11] Patent Number: 5,620,165
[45] Date of Patent: Apr. 15, 1997

[54] RETRACTING RING SEAL VALVE

[75] Inventor: W. Clark Dean, Simsbury, Conn.

[73] Assignee: United Technologies Corporation, Hartford, Conn.

[21] Appl. No.: 543,951

[22] Filed: Oct. 17, 1995

[51] Int. Cl.⁶ .................................................. F16K 25/00
[52] U.S. Cl. ........................... 251/158; 251/177; 251/187
[58] Field of Search ................................... 251/158, 177, 251/187, 179, 301, 193

[56]              References Cited
            U.S. PATENT DOCUMENTS

| | | | |
|---|---|---|---|
| 1,680,245 | 8/1928 | Penn | 251/129.2 |
| 1,735,511 | 11/1929 | Shrode | 251/129.2 |
| 2,252,246 | 8/1936 | Ray | 251/41 |
| 2,358,999 | 9/1944 | Ray | 173/330 |
| 2,675,508 | 4/1954 | Ray | 317/175 |
| 2,863,629 | 12/1958 | Knox | 251/187 |
| 3,047,006 | 7/1962 | Transeau | 251/177 |
| 3,237,916 | 3/1966 | Bryant | 251/158 |
| 3,254,873 | 6/1966 | Knox | 251/187 |
| 3,321,174 | 5/1967 | Schertler | 251/158 |
| 3,683,962 | 8/1972 | Good | 137/609 |
| 4,062,515 | 12/1977 | Bobo | 251/187 |
| 4,545,562 | 10/1985 | Feurgard et al. | 251/129.2 |
| 4,708,155 | 11/1987 | Austin et al. | 131/1 |
| 4,838,520 | 6/1989 | Frindel et al. | 251/187 |
| 4,840,193 | 6/1989 | Scheil | 137/627.5 |

Primary Examiner—Denise L. Ferensic
Assistant Examiner—Joanne Y. Kim
Attorney, Agent, or Firm—Malcolm J. Chisholm, Jr.

[57]                    ABSTRACT

A retracting ring seal valve is disclosed for adjustably restricting and permitting fluid flow in a two-direction fluid control system. In a particular embodiment the invention comprises a valve body that defines a central passage through which the fluid passes, a side chamber adjacent the central passage, and a sealing shoulder around a circumference of the passage. A gate assembly adjustably moveable between the central passage and the side chamber includes a ring seal surrounding a peripheral edge of a sealing surface of the gate assembly so that a retainer moves the ring seal to seal a flow gap defined between the sealing surface and the sealing shoulder of the valve body to restrict flow of fluid through the central passage. An actuating assembly secured between the gate assembly and the valve body both positions the gate assembly to restrict or permit flow of fluid through the passage and also moves the ring seal into and out of the flow gap. To open the retracting ring seal valve and thereby permit flow of fluid through the central passage, the actuating assembly first retracts the ring seal from simultaneous, sealing contact with the sealing shoulder and peripheral edge of the sealing surface so that any friction resulting from contact between the gate assembly and sealing shoulder is eliminated. The actuating assembly next pivots the gate assembly in a direction perpendicular to the flow of the fluids out of the central chamber into the adjacent side chamber.

15 Claims, 7 Drawing Sheets

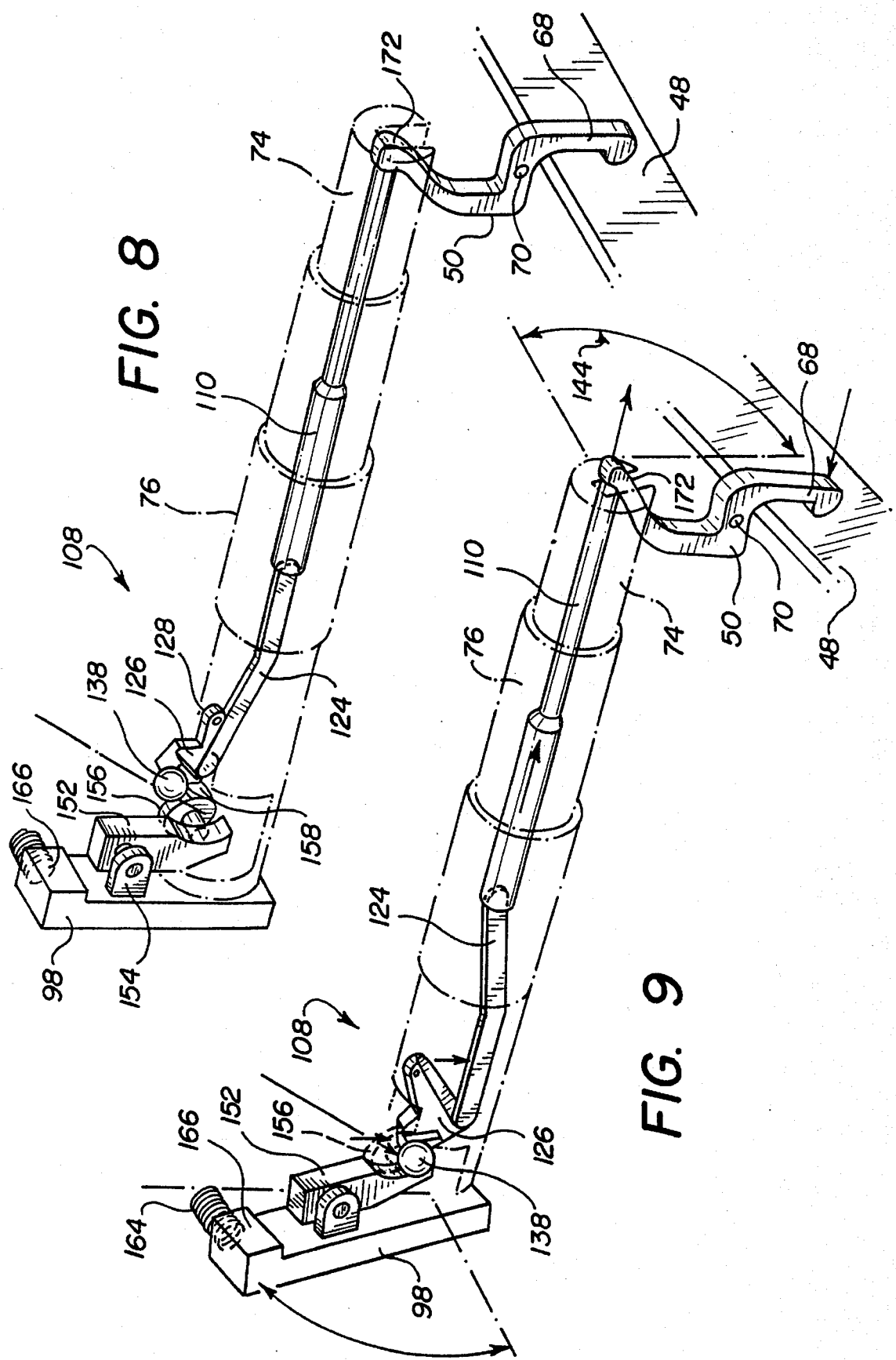

RETRACTING RING SEAL VALVE

TECHNICAL FIELD

The present invention relates to valves in pipes for restricting flow of fluids, and especially relates to a valve for restricting flow of fluids in both directions of a pipe.

BACKGROUND OF THE INVENTION

It is well known in the valve art that substantially greater power is required to operate valves that provide a zero leakage seal against flow pressure from two directions than is required to seal against flow pressure from one direction. Additionally, power requirements for such valves ascend in proportion to increases in system operating pressures that the valves must seal. For example, a common gate valve may provide a zero leakage seal against two-directional flow, wherein the gate valve includes a valve body that defines a central passage having a reduced diameter sealing shoulder around a circumference of the passage through which the fluid flows, and an adjustable gate having a sealing surface that is positioned so that a peripheral edge of the sealing surface contacts the sealing shoulder to seal the central passage of the valve body against any fluid flow. The sealing surface is adjustably moved away from the sealing shoulder to permit fluid flow. Moving the gate into and out of contact with the sealing shoulder requires application of adequate power to overcome two primary forces; namely—friction between the sealing surface and sealing shoulder, and pressure on the gate from the fluids contained within the central passage.

Efforts to reduce required power to operate such valves have resulted in many differing valve structures including a two-stage gate valve, wherein the sealing surface in a first stage is displaced away from the sealing shoulder in a direction that is parallel to the flow of the fluid in the passage. Next, in a second stage, the sealing surface is moved out of the passage. By moving the sealing surface parallel to the flow of fluids in the first stage, friction between the peripheral edge of the sealing surface and the sealing shoulder is eliminated as the sealing surface moves in the second stage, and a flow gap is opened between the sealing surface and the sealing shoulder so that any pressure differential between upstream and downstream sides of the sealing surface is reduced. Elimination of the friction and reduction of the pressure differential reduces power requirements to move the gate out of the passage. The reduction of power is significant when the movement of the sealing surface in the first stage is both parallel to and also in the direction of the fluid flow. However, in a two-directional flow system, the required power will eventually have to be adequate to move the sealing surface in a direction opposite to the direction of fluid flow, thereby requiring substantial power.

In working environments such as outer space, fluid control systems often include very high operating pressures, yet design parameters mandate valves having modest weight, power and volume components. Typically such valves are actuated by solenoids in response to control signals, and are often used to regulate pressurization of such facilities as laboratory research modules carried on board the United States "Space Shuttle". For example, a research module capable of sustaining human research activity for many hours pressurized to one (1) atmosphere would benefit by a valve capable of voiding test chambers within the module to the hard vacuum of outer space, wherein the valve has a conductance value of thirty (30) liters per second in a one and five-tenths (1.5) inch line-sized valve and the valve could be opened or closed at any time, while exposed to a pressure differential of 40 p.s.i.d. in either direction, through application of no more than thirty (30) watts of electrical power. Known reduced power valves are incapable of achieving such performance characteristics.

Accordingly, it is the general object of the present invention to provide a valve that overcomes the excessive power, weight and volume problems of the prior art.

It is a more specific object to provide a valve that minimizes power requirements in providing a zero leakage seal against flow pressure from two directions.

It is another specific object to provide a valve that compensates for non-linear force characteristics of common solenoids used to activate such a valve.

The above and other advantages of this invention will become more readily apparent when the following description is read in conjunction with the accompanying drawings.

DISCLOSURE OF THE INVENTION

A retracting ring seal valve is disclosed for adjustably restricting and permitting fluid flow in a two-direction fluid control system. In a particular embodiment the invention comprises a valve body that defines a central passage through which the fluid passes, a side chamber adjacent the central passage, and a sealing shoulder around a circumference of the passage; a gate assembly adjustably moveable between the central passage and the side chamber, that includes a ring seal surrounding a peripheral edge of a sealing surface of the gate assembly so that a retainer moves the ring seal to seal a flow gap defined between the sealing surface and the sealing shoulder of the valve body to restrict flow of fluid through the central passage; and an actuating assembly secured between the gate assembly and the valve body that positions the gate assembly to restrict or permit flow of fluid through the passage.

To open the retracting ring seal valve and thereby permit flow of fluid through the passage, the actuating assembly first retracts the ring seal from simultaneous, sealing contact with the sealing shoulder and peripheral edge of the sealing surface so that any friction resulting from contact between the gate assembly and sealing shoulder is eliminated. The actuating assembly next pivots the gate assembly in a direction perpendicular to the flow of the fluids out of the central passage into the adjacent side chamber so that flow of the fluid through the central passage is unrestricted. To re-seal the passage, the actuating assembly first pivots the gate assembly back into the central passage, and then moves the ring seal into simultaneous contact with the sealing shoulder and peripheral edge of the sealing surface.

In a further particular embodiment, the actuating assembly includes a push rod that moves the retainer to retract the ring seal. The push rod is connected to a solenoid link by a triple-pivot push link that mechanically compensates for non-linear force characteristics of a solenoid moving the solenoid link. In use of this embodiment a first component of motion of the solenoid link causes a longitudinal movement of the push rod to retract the retainer and ring seal and secure the retainer and ring seal in a retracted position. The push rod is co-axial with a main shaft secured between the gate assembly and valve body and affixed to the solenoid link, so that a second component of motion of the solenoid link causes a rotational motion of the main shaft to pivot the gate assembly out of the central passage into the side chamber. Consequently, a single motion of the solenoid link first longitudinally moves the push rod to retract and secure the ring seal and next rotates the main shaft to pivot the gate assembly into the side chamber, permitting unrestricted flow of the fluid through the central passage. When a solenoid that actuates the solenoid link is de-energized, a re-seal spring rotates the shaft and affixed gate assembly back into the central passage, a cam surface releases a securing means from securing contact with the actuating assembly, and a retainer spring forces the retainer to move the ring seal into simultaneous, sealing contact with the peripheral edge of the sealing surface and the sealing shoulder to seal the central passage against flow of fluids.

The retracting ring seal valve of the present invention requires less power than prior art valves primarily because, to eliminate friction between the gate assembly and the sealing shoulder, the retracting ring seal valve must only overcome differential pressure loads acting on a seal surface area of the ring seal, as opposed to overcoming differential pressure loads acting on much larger sealing surfaces of prior art valves. Additionally, the triple-pivot push link permits use of efficient, non-linear force displacement solenoids, affording further power and weight savings.

BRIEF DESCRIPTION OF THE DRAWINGS

FIG. 8 is a fragmentary, perspective view of the FIG. 6 actuating assembly showing the triple-pivot push link in the first or unsecured position.

FIG. 9 is similar to FIG. 8 but showing the triple-pivot push link in the second or secured position.

BEST MODE FOR CARRYING OUT THE INVENTION

Figure 1:
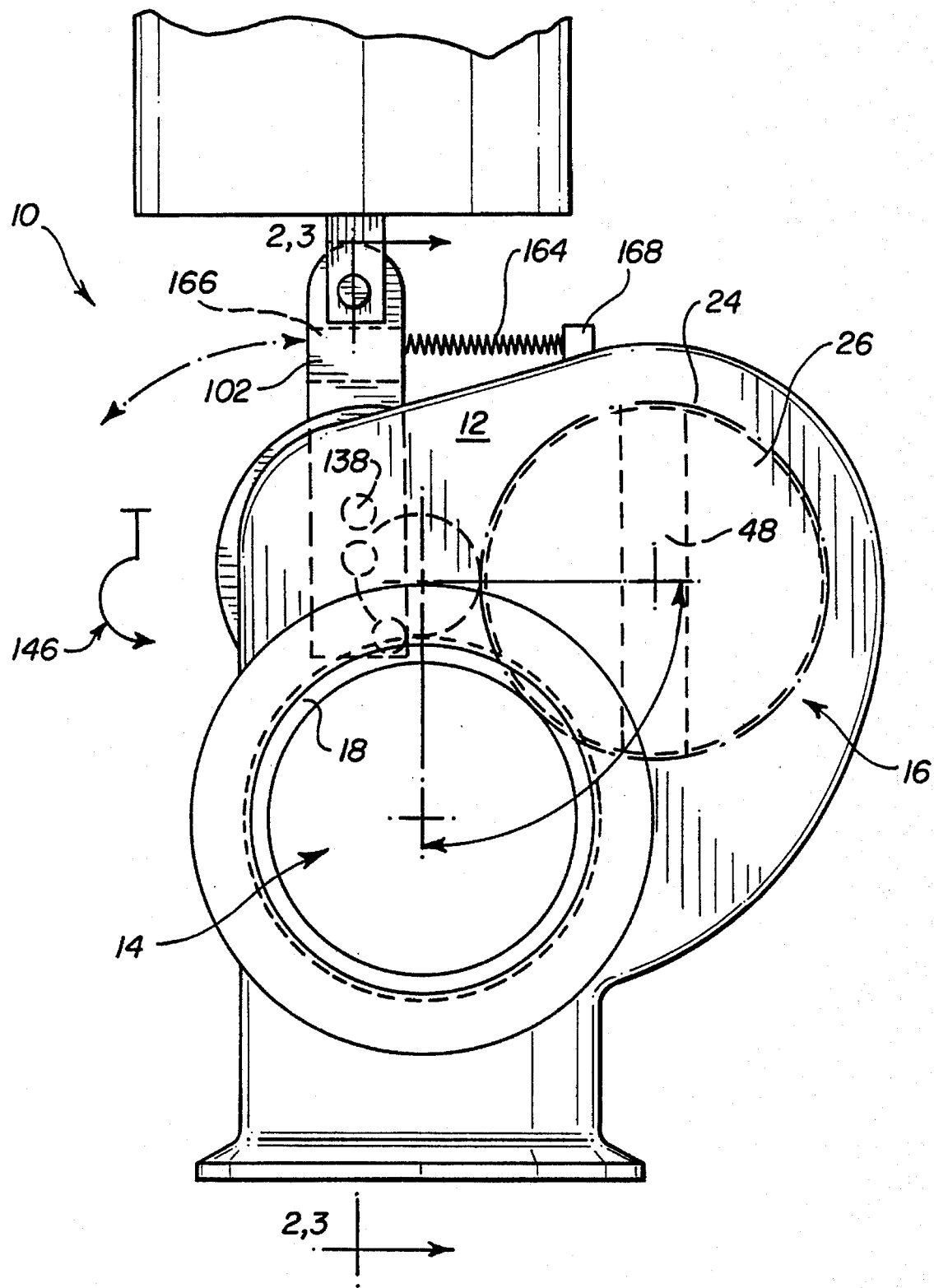
FIG. 1 is a front plan view of a retracting ring seal valve of the present invention showing movement of a sealing surface of a gate assembly from a central passage into a side chamber of a valve body of the retracting ring seal valve, and showing in hatched lines rotational movement of a main shaft of an actuating assembly that causes the sealing surface to move from the central passage to the side chamber.
Figure 2:
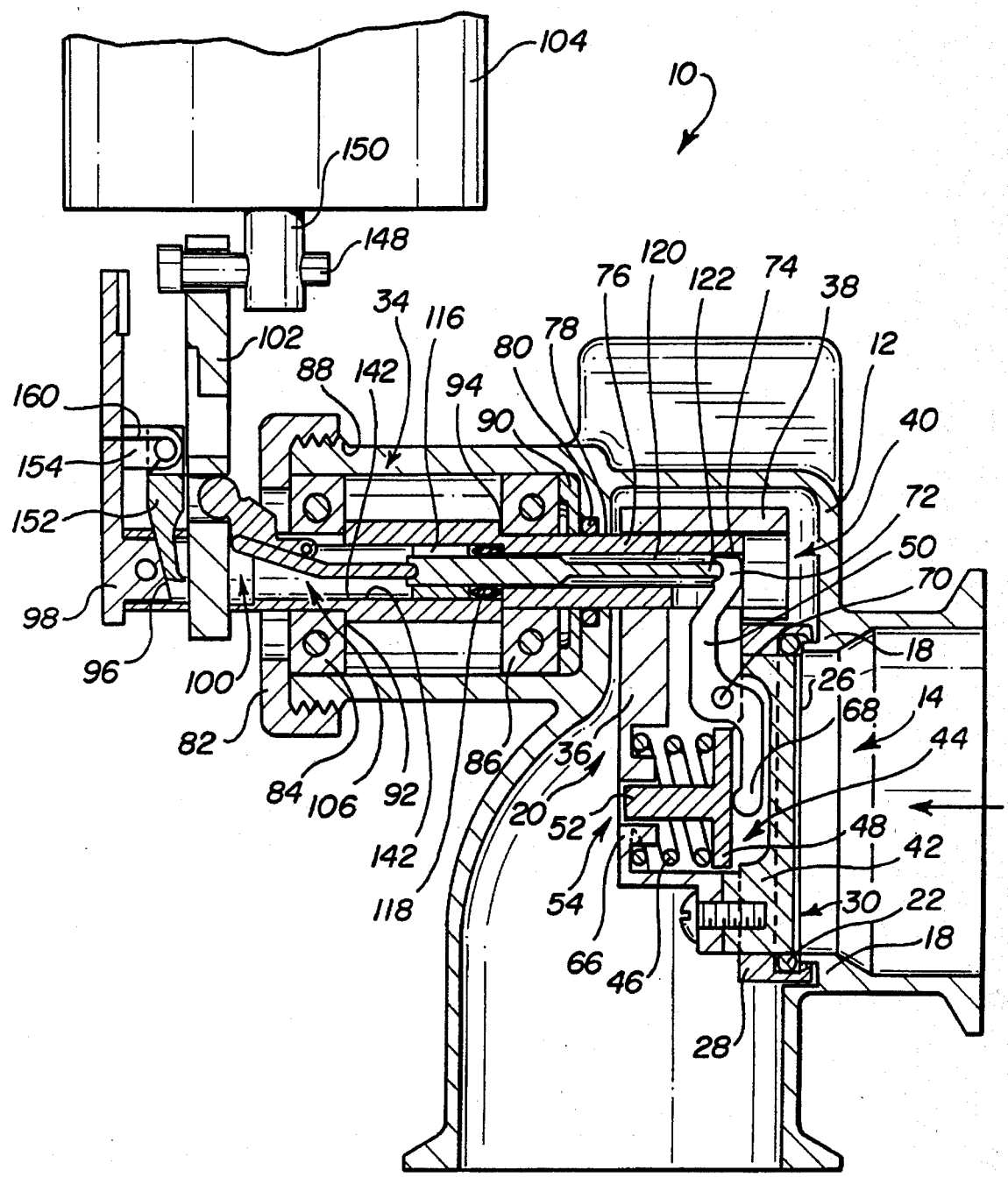
FIG. 2 is a side, cross-sectional, plan view of the FIG. 1 retracting ring seal valve taken along a sight line marked 2,3—2,3 in FIG. 1, showing a gate assembly having the FIG. 1 sealing surface secured within the central passage so that a ring seal is positioned in a flow gap between the central passage and sealing surface to restrict flow through the central passage, and showing an actuating assembly between the gate assembly and FIG. 1 valve body.
Figure 3:
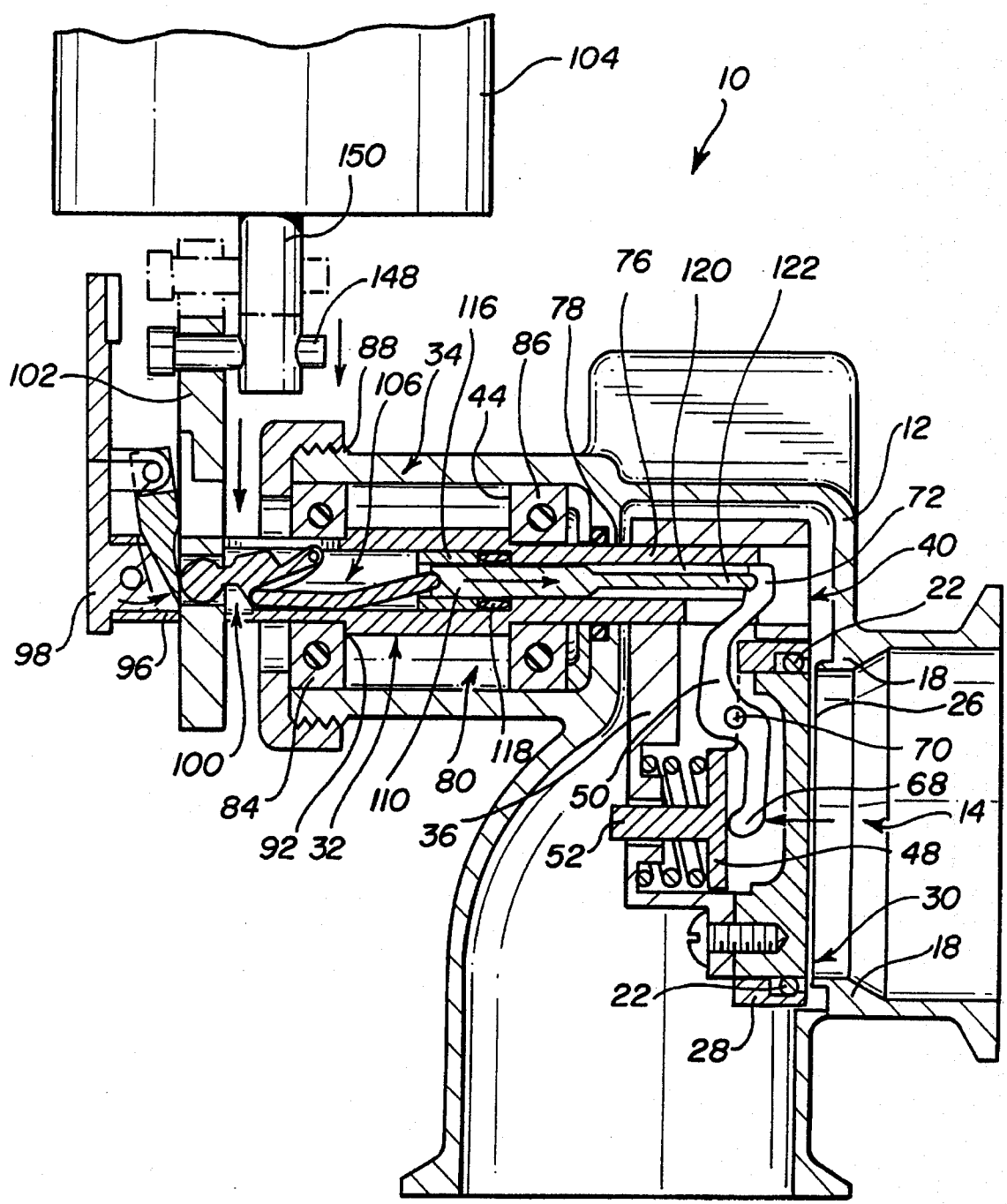
FIG. 3 is similar to FIG. 2, but show the actuating assembly moved from its position in FIG. 2 to a position to move a retainer of the gate assembly to retract the ring seal away from the flow gap.

Referring to the drawings in detail, a retracting ring seal valve of the present invention if shown and generally designated by the reference numeral 10. As best shown in FIGS. 1–3, the retracting ring seal valve basically comprises a valve body 12 that defines a central passage 14 through which fluid passes, a side chamber 16 adjacent and in fluid communication with the central passage 14, and a sealing shoulder 18 around a circumference of the central passage 14; a gate assembly 20, adjustably moveable between the central passage 14 and the side chamber 16, that includes a ring seal 22 surrounding a peripheral edge 24 of a sealing surface 26 of the gate assembly 20, and also includes a retainer 28 that adjustably moves the ring seal 22 to seal or open a flow gap 30 (best seen in FIGS. 4 and 5) defined between the sealing surface 26 and sealing shoulder of the central passage 14 to restrict or permit flow of fluids through the central passage; and an actuating assembly 32 secured between the gate assembly 20 and a service cavity 34 of the valve body 12 that adjustably controls the gate assembly to restrict or permit flow of fluids through the central passage 14.

As best seen in FIGS. 2 and 3, a gate assembly means for adjustably restricting flow of fluids through the central passage 14, such as the gate assembly 20, includes a swing arm 36 having a pivot end 38 pivotally secured within a swing-arm mounting cavity 40 of the valve body 12. The sealing surface 26 of the gate assembly 20 is secured to a sealing end 42 of the swing arm 36. The swing arm 36 defines a retainer-spring cavity 44 for housing a retainer spring 46, a bridge 48 of the retainer 28, and a lift arm 50. A retainer alignment post 52 extends from the bridge 48 into an alignment throughbore 54 within the sealing end 42 of the swing arm 36.

Figure 4:
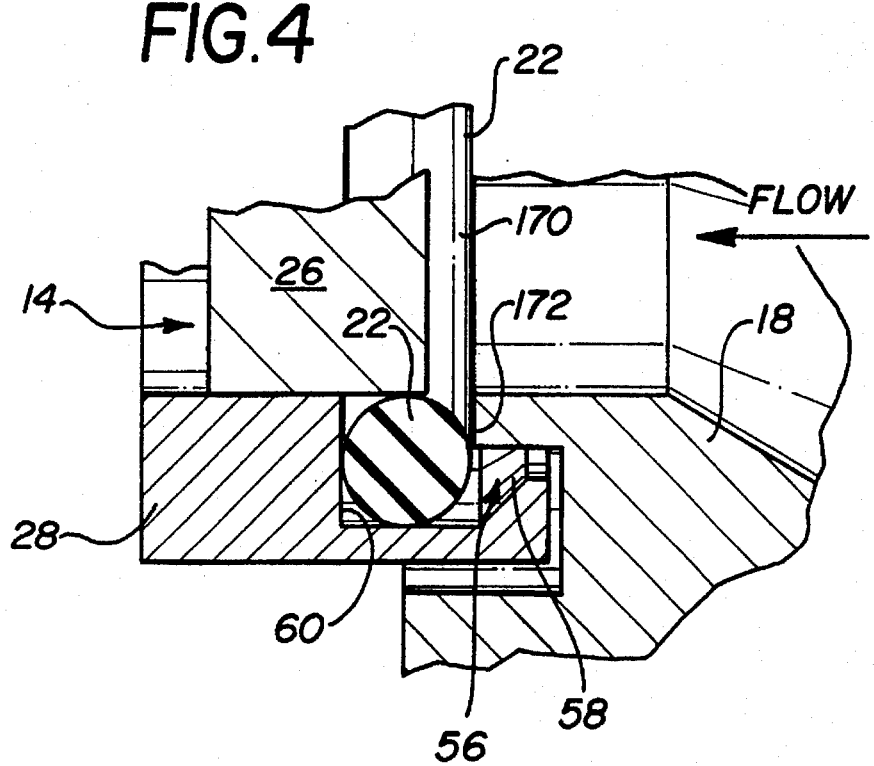
FIG. 4 is a fragmentary, cross-sectional, plan view of the FIG. 2 retracting ring seal valve showing the retainer securing the ring seal in a sealing position in the flow gap between the sealing surface of the gate assembly and a sealing shoulder of the central passage.
Figure 5:
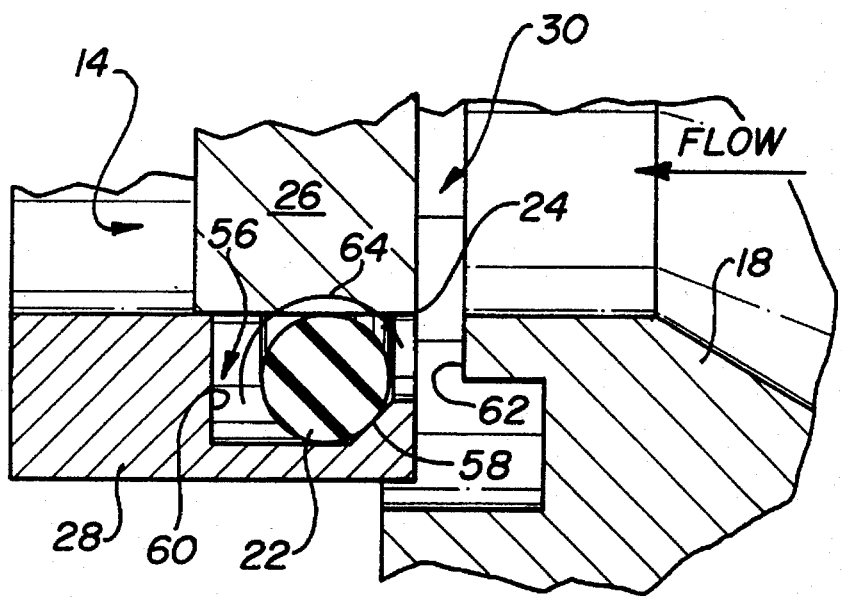
FIG. 5 is similar to FIG. 4, but showing the retainer having retracted the ring seal out of the flow gap.

As shown in FIGS. 4 and 5, the retainer 28 defines a ring-seal slot 56 for housing the ring seal 22. The ring-seal slot 56 has an axial length (defined as a distance between a slot front edge 58 and a slot back edge 60) that is equal to or greater than a compressed diameter of the ring seal 22 (the "compressed diameter" being the diameter of a ring seal 22 when positioned within the ring-seal slot and over the sealing surface 26, which is often slightly greater than a static diameter, in the case of ordinary elastomeric "O-rings") plus an axial length of the flow gap 30 which axial length is defined as the shortest distance between a sealing edge 62 of the sealing shoulder of the valve body 12 and the peripheral edge 24 of the sealing surface 26. As seen best in FIGS. 4 and 5, where the axial length of the ring-seal slot is equal to or greater than the compressed diameter of the ring seal 22 plus the axial length of the flow gap 30, movement by the retainer 28 of the ring seal 22 out of the flow gap 30 permits the ring seal 22 to roll within the ring-seal slot 56 as designated by a first rotational arrow 64 in FIG. 5, thereby reducing friction between the ring seal 22 and the sealing surface 26 compared to a level of friction if the ring seal had to slide against the sealing surface. For convenience, the ring-seal slot 56 having the aforesaid axial length equal to or greater than the compressed diameter of the ring seal 22 plus the axial length of the flow gap 30 will be occasionally referred to as an "expanded ring-seal slot" 56.

When the retainer 28 has moved or retracted the ring seal 22 from a sealed position shown in FIG. 4 to an unsealed position shown in FIG. 5, the gate assembly 20 no longer contacts the sealing shoulder 18, and fluid within the central passage 14 is able to move in either direction through the flow gap 30. The retainer 28 is secured in the sealed position shown in FIG. 4 by the force of the retainer spring 46 secured around a retainer spring mount 66 adjacent the alignment throughbore 54 within the retainer spring cavity 44. The retainer spring 46 may be a standard coil spring well known in valve art selected to exert adequate force to secure the ring seal 22 in the sealed position shown in FIG. 4 against specific pressure forces exerted by any operating fluid within the central passage 14. The retainer spring extends from the retainer spring mount 66 to contact the bridge 48 of the retainer 28. A bridge-contact end 68 of the lift arm 50 contacts the bridge 48 at a surface of the bridge opposed to a surface contacted by the retainer spring to counteract the force of the retainer spring 46 and thereby move the retainer 28 and ring seal 22 from the sealed position of FIG. 4 to the unsealed position of FIG. 5. The lift arm 50 pivots about a lift pivot 70, and a shaft contact end 72 of the lift arm extends up into and is captured and secured by a swing arm connection 74 of a main shaft 76 of the actuating assembly 32. When the retainer 28 has moved the ring seal 22 into the unsealed position shown in FIG. 5, rotational movement of the main shaft 76 rotates the gate assembly 20 from the central passage 14 into the side chamber 16 (best seen in FIG. 1), to permit unrestricted flow of fluid through the central passage 14 of the valve body 12.

As best seen in FIGS. 2 and 3, an actuating assembly means for adjusting the gate assembly 20 between sealed and unsealed positions, such as actuating assembly 32, includes the main shaft 76, that extends into the swing arm mounting cavity 40 and is secured by its swing arm connection 74 (such as by a press fitting, or standard threaded bolt and nut (not shown)) to the lift arm 50. The main shaft 76 passes out of the swing arm mounting cavity 40 and into the service cavity 34 through a service bore 78 in the valve body. A service cavity seal 80 surrounds the main shaft adjacent the service bore 78 to prevent fluids passing from the swing arm mounting cavity 40 into the service cavity 34, and the seal may be any standard seal well known in the art for such purposes. The main shaft 76 is supported within a fixed position with respect to longitudinal movement toward or away from the service bore 78 and a service cap 82 by a first low friction bearing 84 and a second low friction bearing 86. The service cap 82 may be threaded, as shown in FIGS. 2 and 3, onto a threaded mouth 88 of the service cavity 34 so that the cap 82 may progressively apply a preload force to the first and second low friction bearings 84, 86, which preload force is reacted by a shaft seal retainer 90 adjacent the service cavity seal 80. A first bearing shoulder 92 and a second bearing shoulder 94 are defined along the main shaft 76 to secure the first and second low friction bearings 84, 86 in fixed longitudinal positions along the shaft 76. The service cap 82 and bearings 84, 86 secure the main shaft 76 against longitudinal movement to or away from the service bore 78, while permitting rotational movement of the shaft 76. As seen in FIGS. 2 and 3 the main shaft 76 continues through the service cap 82 and has an actuating end 96 secured to a pivot strut 98. Between the pivot strut 98 and service cap 80, the main shaft 76 defines an actuating slot 100 that receives a solenoid link 102 extending from a solenoid 104.

The main shaft 76 of the actuating assembly 32 has a push-rod cavity 106 (shown in FIGS. 2 and 3) that houses a ring-seal retraction means 108 (best seen in FIGS. 6–9) for moving the ring seal by exerting a longitudinal force on the shaft contact end 72 of the lift arm 50 to pivot the lift arm and thereby retract the ring seal 22 out of the flow gap 30. An example of a ring-seal retraction means 108 is shown in FIGS. 6–9 in the form of a push rod 110 and triple-pivot push link 112 having a mechanical securing means 114 for securing the push rod 110 and triple-pivot push link 112 against longitudinal movement during rotation of the push rod and triple-pivot push link. The push rod 110 is supported within the push rod cavity 106 by a push rod bushing 116 (seen in FIGS. 2 and 3) that surrounds the push rod and contacts walls of the drive shaft defining the push rod cavity 106. A push rod seal 118 also surrounds the push rod 110 between the push rod bushing 116 and a push rod through-bore 120 within the main shaft (again seen in FIGS. 2 and 3). A lift arm contact end 122 of the push rod 110 passes through the push rod throughbore 120 to contact the shaft contact end 72 of the lift arm 50.

As best seen in FIGS. 6–9, the triple-pivot push link 112 includes a long stroke-link 124 and a short stroke-link 126. The short stroke-link 126 is pivotally secured by a pivot post 128 to an interior wall of the push rod cavity 106. A first end 130 of the long stroke-link 124 is pivotally secured to a pivot end 132 of the short stroke-link 126, and a second end 134 of the long stroke-link 124 is pivotally secured to a pivot tip 136 of the push rod 110. A trigger ball 138 extends from the short stroke-link 126 out of the push rod cavity 106 through the actuating slot 100 of the main shaft 76 and into a trigger-ball bore 140 of the solenoid link 102, so that downward movement (as shown in the sequence of FIGS. 2 to 3) of the solenoid link causes the trigger ball 138 to move first downward (as also shown in the sequence of FIGS. 6 to 7, and FIGS. 8 to 9), thereby causing the triple-pivot push link 112 and push rod 110 to move longitudinally, to retract the ring seal 22 from a sealed position (shown in FIG. 4) to an unsealed position (shown in FIG. 5).

As best seen in FIG. 1, the trigger ball 138 is laterally displaced from an axis of rotation of the main shaft 76. (Hereinafter said lateral displacement being referred to for convenience as "the trigger ball 138 being positioned eccentrically on the short stroke-link 126.") Therefore, a first component of motion of the solenoid link 102 moves the trigger ball 138 in a direction perpendicular to the axis of rotation of the main shaft 76 until the resulting pivoting of the short stroke link causes the long stroke-link 124 to contact a stop surface 142 of the interior wall of the main shaft 76 that defines the push rod cavity 106. Further longitudinal movement of the push rod 110 then ceases as the ring seal 22 has thereby been moved to the aforesaid unsealed position shown in FIG. 5. Thereafter, a second component of continued motion of the solenoid link 102 causes the eccentrically positioned trigger ball 138 to move in a direction parallel to a cylindrical circumference of the main shaft 76 and to thereby rotate the main shaft 76, which causes the swing arm 36 of the gate assembly 20 to swing the gate assembly into the side chamber 16, as shown in FIG. 1, and represented by a second rotational arrow 144 in FIG. 9. A third directional arrow 146 in FIG. 1 schematically represents the movement of the trigger ball 138 in response to the first and second components of the movement of the solenoid link. To effect the second component of motion, the solenoid link 102 pivots about a solenoid pivot post 148 secured between the solenoid link 102 and a solenoid mount 150 of the solenoid 104.

Figure 6:
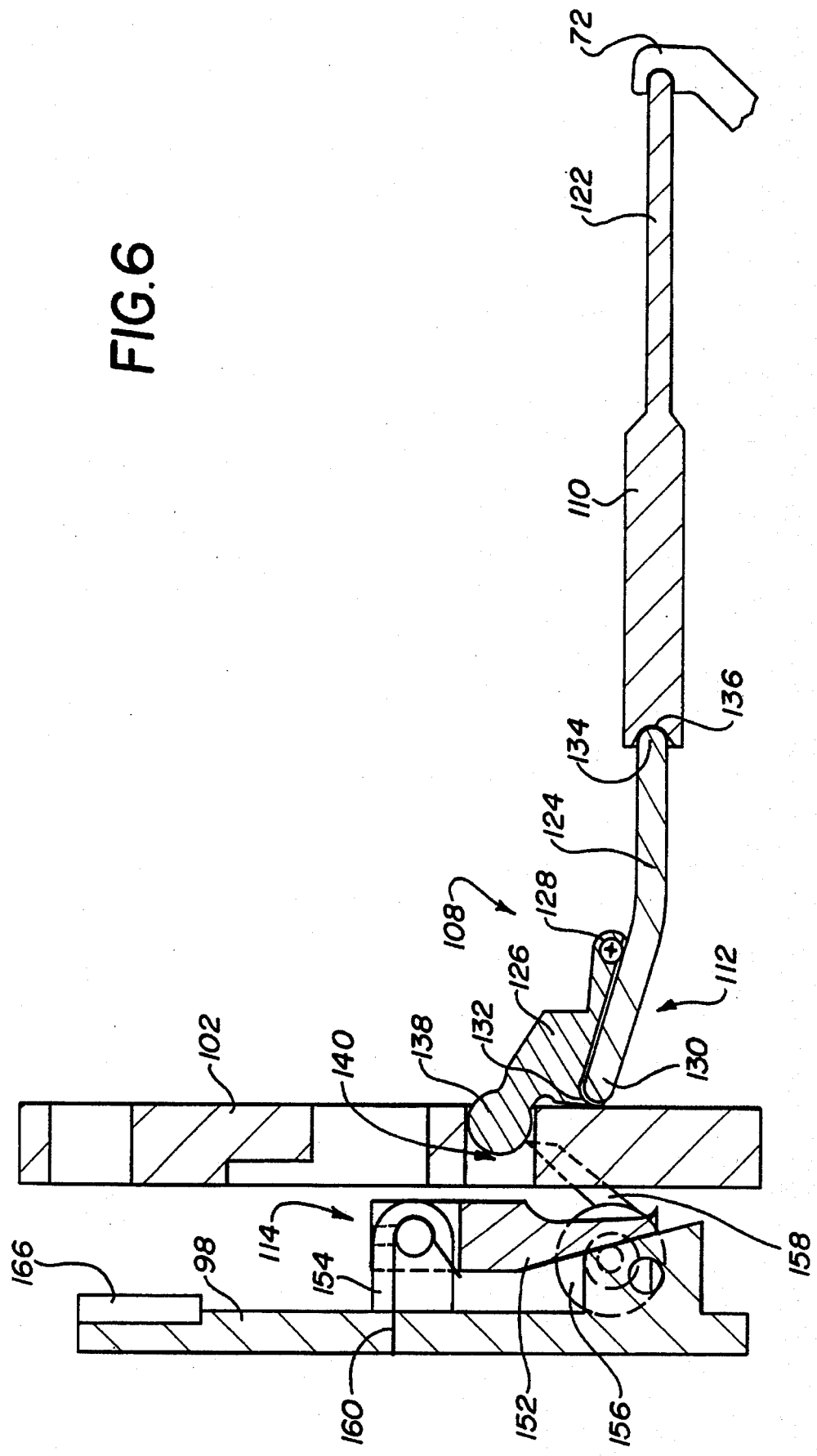
FIG. 6 is fragmentary, cross-sectional, side plan view of the FIG. 2 actuating assembly showing a triple-pivot push link in a first or unsecured position.

The triple-pivot push link 112 compensates for non-linear force displacement characteristics of standard solenoids because of an over-center action of the long stroke-link 124 between its first end 130 and second end 134 with respect to the short stroke-link 126 and its pivot post 128 and pivot end 132. A solenoid force applied to the solenoid link 102 to commence a retraction motion as shown in FIG. 6 produces a first moment in the short stroke-link 126 in rotation around pivot post 128 with a magnitude or first moment arm equal to that force multiplied by a distance from a center of the trigger ball 128 to a center of the pivot post 128 in a direction normal to the solenoid link 102. This first moment is reacted by an equal and opposite second moment produced by a force on the second end 134 of the long stroke-link 124 which in turn is generated by the retainer spring 46 preload force acting through the lift arm 50 to the pivot tip 136 of the push rod 110. A line of action of the force in the long stroke-link 124 extends from its second end 134 to its first end 130. The magnitude of the second moment, or second moment arm, produced by this force is equal to the long stroke-link force multiplied by a normal distance between its line of action and the pivot post 128.

Figure 7:
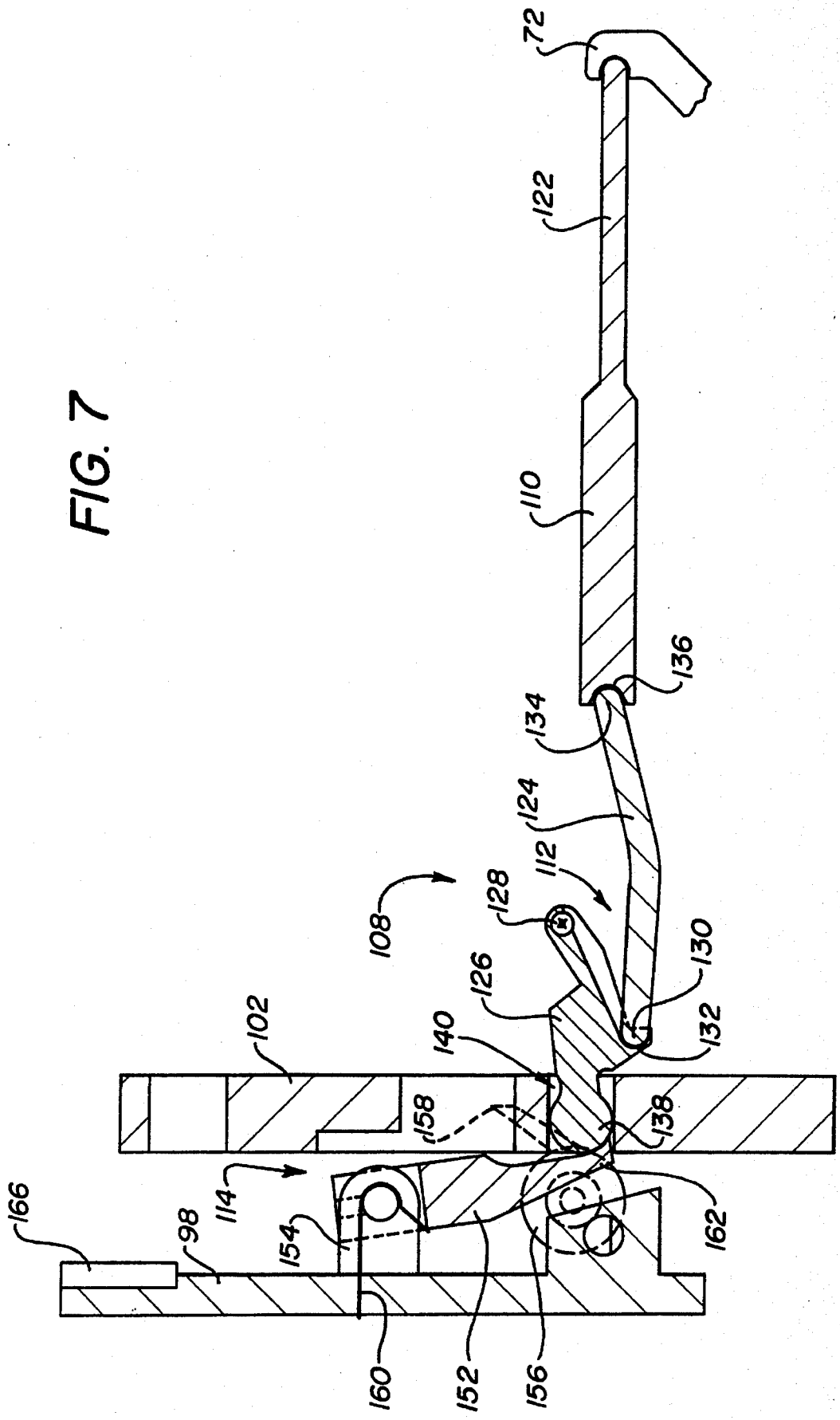
FIG. 7 is similar to FIG. 6 but show the triple-pivot push link in second or secured position.

As an example, a standard solenoid may have a low force level (e.g., one pound) for an initial distance and a much larger force level (e.g., six pounds) for a secondary distance. As shown in FIG. 6 (and using the following comparative dimensions only for demonstrating approximate distances shown in FIGS. 6 and 7), during movement of the solenoid link 102 through a solenoid's initial distance the second moment arm distance is approximately one-twentieth (or approximately 0.02 inches) of the first moment arm distance (approximately 0.40 inches). As shown in FIG. 7, during movement of the solenoid link 102 through the solenoid's secondary distance, the second moment arm distance is much larger or about one-half (or approximately 0.20 inches) of the first moment arm distance, which is about the same as during the initial distance (approximately 0.42 inches). This change in moment arm dimension with a continuing solenoid link stroke allows a relatively constant spring preload force to be lifted a short first distance by a standard solenoid having a force that starts at a low level through its initial distance and rapidly increases to a higher level over its longer secondary distance to lift the spring preload force over a longer final distance. The beneficial effect of the described triple-pivot push link 112 and comparable structures in compensating for non-linear force displacement characteristics of standard solenoids will be referred to herein as the triple-pivot push link 112 having over-center means for compensating for non-linear force displacement characteristics of standard solenoids.

As best seen in FIGS. 6–9, an example of the mechanical securing means 114 for securing the push rod 110 and triple-pivot push link 112 against longitudinal movement during rotation of the push rod 110 and triple-pivot push link 112 includes a latch 152 pivotally secured to a latch mount 154 on the pivot strut 98 of the actuating end of the main shaft 76. A cam roller 156 is affixed to the latch 152 so that it is adjacent to a ramp-shaped cam surface 158 (shown in hatched lines in FIGS. 6 and 7). The cam surface 158 is secured to the valve body 12 and therefore does not rotate when the solenoid link rotates the main shaft 76, pivot strut 98 secured to the shaft 76 and latch 152 affixed to the pivot strut 98. A latch torsion spring 160 biases a pawl end 162 of the latch 152 away from the pivot strut 98 so that the cam roller 156 is in contact with the cam surface 158 whenever the pivot arm is upright, as shown in FIG. 6. Whenever the solenoid link 102 has moved the trigger ball 138 through the link's first component of movement and started to rotate the trigger ball 138 main shaft 76 and pivot strut 98, the cam roller 156 then moves away from the ramp-shaped cam surface 158 so that the latch torsion spring 160 forces the pawl end 162 of the latch into the trigger ball bore 140 of the solenoid link 102, as shown in FIG. 7. The pawl end 162 of the latch thereby secures the trigger ball 138 against longitudinal movement of the push rod 110 or triple-pivot push link 112 resulting from pressure forces acting upon the ring seal 22 during movement of the gate assembly into or out of the side chamber 16.

In use of the retracting ring seal valve 10 of the present invention for permitting flow of fluids through the central passage 12 by going from a sealed to an unsealed deployment, the solenoid 104 is energized so that the solenoid link 102 moves away from the solenoid. In a first component of motion of the solenoid link 102, the trigger ball 138 captured in the trigger ball bore 140 of the solenoid link moves with the solenoid link away from the solenoid 104 and causes the affixed triple-pivot push link 112 to pivot about pivot post 128 so that the push rod 110 move longitudinally to force the lift arm 50 to pivot about its lift pivot 70 thereby causing the bridge 48 of the retainer 28 to roll and retract the ring seal 22 out of the flow gap 30. Next, the long stroke link 124 of the triple-pivot push link 112 contacts an interior wall of the push-rod cavity 106 stopping further longitudinal movement of the push rod 110, and a second component of continued motion of the solenoid link 102 causes the trigger ball 138 that is eccentrically positioned on the short stroke link 126 to rotate the triple-pivot push link 112 and affixed main shaft 76 so that the gate assembly 20 rotates out of the central passage 14 into the side chamber 16, thereby permitting unrestricted flow through the central passage 14.

To return the retracting ring seal valve 10 to a sealed position, the solenoid 104 is de-energized and a re-seal spring means 164 for rotating the gate assembly 20 back into the central passage 14, rotates the main shaft 76 to position the gate assembly in the central passage 14. (Any re-seal spring means may be used for that purpose, such as common torsion springs (not shown) well known in solenoid-actuated valve art for returning valves to an initial position whenever a solenoid that has moved a valve out of that initial position is de-energized.) The re-seal spring means shown in FIGS. 1 and 9 is a re-seal spring 164 that is secured between a strut spring block 166 on the pivot strut 98 and a valve body spring block 168 (shown in FIG. 1) which pulls the pivot strut 98 back to the position shown in FIG. 6, thereby rotating the main shaft 76 to reposition the gate assembly 20 in the central passage 14. As the pivot strut 98 approaches that position, the cam roller 156 contacts the cam surface 158 thereby forcing the pawl end 162 of the latch 152 out of the trigger ball bore 140 so that the force of the retainer spring 46 is thereby free to force the retainer 28 and ring seal 22 into the flow gap 30 (shown in FIGS. 2 and FIG. 4) while simultaneously pivoting the lift arm 50 of the gate assembly 20 so that it longitudinally moves the push rod 110 to return the trigger ball 138 and solenoid link 102 back to the sealed position shown in FIGS. 2, 6 and 8.

It can be readily seen in FIGS. 2 and 3 that the sealing surface 26 is indirectly secured to the valve body 12 by way of a mechanical linkage through the swing arm 36 of the gate assembly 20, through the main shaft 76, and through the first and second low friction bearings 84, 86 to the service cap 82 that is secured to the valve body 12. As a result of that mechanical linkage, and because rotation of the sealing surface 26 into and out of the central passage 14 is in a direction perpendicular to a pressure differential of fluids within the central passage 14, any pressure forces of such fluids within the central passage operating upon the sealing surface 26 during that rotation into and out of central passage are effectively neutralized. Consequently, the only forces the solenoid must overcome to move the sealing surface 26 from a sealed to an unsealed position are pressure, friction, and spring preload forces operating upon the ring seal 22, as well as some friction forces on the main shaft 76. The pressure forces are a function of a seal surface area 170 of the ring seal 22, which seal surface area 170 is defined as an area of a planar annular ring bounded by an inner diameter determined by an exterior surface of the ring seal 22 between the peripheral edge 24 of the sealing surface 26 and bounded by an outer diameter determined by a seal contact corner 172 of the sealing edge 62 of the sealing shoulder 18 when the ring seal 22 is in its sealed position shown in FIG. 4. Those pressure forces are dramatically reduced compared to pressure forces acting upon an entire sealing surface, as with known valves. Additionally, because of the expanded ring seal slot 56 (best seen in FIGS. 4 and 5), the ring seal 22 may be rolled out of a position sealing the flow gap, instead of being slid out of such a position, thereby dramatically reducing friction forces acting upon the ring seal 22.

A working example of the retracting ring seal valve 10 constructed in accordance with the present invention produced a conductance value of thirty (30) liters per second wherein a diameter of the central passage was approximately one and five tenths inches (1.5") and the sealing surface 26 was exposed to a pressure differential of 40 p.s.i.d. in either direction, through application of no more than thirty (30) watts of electrical power. The particular solenoid used in the working example was a Model Number 6EC manufactured by Lucas Ledex, Inc., of Van Dalia, Ohio. The retracting ring seal valve 10 may be manufactured of a variety of conventional materials well known in valve technology.

While the present invention has been described and illustrated with respect to a particular construction of a retracting ring seal valve, it will be understood by those skilled in the art that the present invention is not limited to this particular embodiment. Accordingly, reference should be made primarily to the attached claims rather than the foregoing specification to determine the scope of the invention.

I claim:

1. A retracting ring seal valve for adjustably restricting and permitting fluid flow, comprising:
   a. a valve body that defines a central passage through which the fluid passes, a side chamber adjacent to and in fluid communication with the central passage, and a sealing shoulder around a circumference of the central passage; and
   b. a gate assembly secured within the valve body to adjustably move between the central passage and side chamber, the gate assembly having a ring seal surrounding a peripheral edge of a sealing surface of the gate assembly, the ring seal being adjustably moved by a retainer to seal or open a flow gap defined between the sealing surface and sealing shoulder so that whenever the ring seal seals the flow gap the gate assembly thereby contacts the sealing shoulder to restrict fluid flow through the central passage, and whenever the retainer moves the ring seal out of the flow gap the gate assembly has no contact with the sealing shoulder and moves into the side chamber to permit unrestricted flow of the fluid through the central passage.

2. The retracting ring seal valve of claim 1, wherein the ring seal comprises an "O"-shaped ring and the retainer includes an expanded ring-seal slot having an axial length equal to or greater than a compressed diameter of the ring seal plus an axial length of the flow gap so that the ring seal rolls within the expanded ring-seal slot when the retainer moves the ring seal into or retracts the ring seal out of the flow gap.

3. The retracting ring seal valve of claim 1, wherein the gate assembly further comprises a swing arm pivotally secured within a swing-arm mounting cavity of the valve body for moving the sealing surface of the gate assembly between the central passage and side chamber.

4. The retracting ring seal valve of claim 3, wherein the gate assembly further comprises a retainer spring housed within a retainer spring cavity of the swing arm, a bridge of the retainer extending into contact with the retainer spring, and a lift arm in contact with the bridge of the retainer so that the retainer spring biases the bridge and retainer to move the ring seal into the flow gap, and application of force to the lift arm overcomes the retainer spring bias to retract the ring seal out of the flow gap.

5. The retracting ring seal valve of claim 4, further comprising a retainer alignment post secured to the bridge of the retainer and projecting into an alignment throughbore defined within the swing arm to align the retainer in a fixed position about the peripheral edge of the sealing surface of the gate assembly.

6. A retracting ring seal valve for adjustably restricting and permitting fluid flow, comprising:
   a. a valve body that defines a central passage through which the fluid passes, a side chamber adjacent to and in fluid communication with the central passage, and a sealing shoulder around a circumference of the central passage;
   b. a gate assembly secured within the valve body to adjustably move between the central passage and side chamber, the gate assembly having a ring seal surrounding a peripheral edge of a sealing surface of the gate assembly, the ring seal being adjustably moved by a retainer to seal or open a flow gap defined between the sealing surface and sealing shoulder so that whenever the ring seal seals the flow gap the gate assembly thereby contacts the sealing shoulder to restrict fluid flow through the central passage, and whenever the retainer moves the ring seal out of the flow gap the gate assembly has no contact with the sealing shoulder and moves into the side chamber to permit unrestricted flow of the fluid through the central passage; and
   c. an actuating assembly for moving the ring seal into and out of the flow gap and for moving the gate assembly between the central passage and side chamber, the actuating assembly having a main shaft secured to the gate assembly with an actuating end projecting out of the valve body so that rotation of the actuating end of the main shaft moves the gate assembly between the central passage and side chamber, the main shaft also defining a push-rod cavity for housing a ring-seal retraction means for moving the ring seal into and out of the flow gap by exerting longitudinal force in a direction parallel to a rotational axis of the main shaft through the ring-seal retraction means to the retainer.

7. The retracting ring seal valve of claim 6, wherein the ring-seal retraction means comprises:
   a. a push rod secured within the push rod cavity of the main shaft having a lift arm contact end in contact with a lift arm of the gate assembly that is secured to the retainer, so that longitudinal movement of the push arm moves the lift and affixed retainer to move the ring seal into or out of the flow gap; and
   b. a triple-pivot push link having a long stroke-link pivotally secured between the push rod and a short stroke-link, and having the short stroke-link being pivotally secured to a wall of the push-rod cavity by a pivot post, and having a trigger ball laterally displaced from an axis of rotation of the main shaft projecting from the short stroke-link out of the push-rod cavity through an actuating slot defined in the main shaft so that a first motion of the trigger ball in a direction perpendicular to the axis of rotation of the main shaft causes the short stroke-link to pivot about the pivot post to thereby move the long stroke-link parallel to the axis of rotation of the main shaft thereby moving the push rod, lift arm, retainer and ring seal, and a second motion of the trigger ball parallel to a cylindrical circumference of the main shaft moves the gate assembly between the central passage and side chamber.

8. The retracting ring seal valve of claim 7, wherein the trigger ball projects into a trigger ball bore of a solenoid link affixed to a solenoid so that a continuing motion of the solenoid link moves the trigger ball through its first and second motions.

9. The retracting ring seal valve of claim 7, wherein the triple-pivot push link further comprises an over-centering means for compensating for non-linear force displacement characteristics of common solenoids.

10. The retracting ring seal valve of claim 6, wherein the ring seal comprises an "O"-shaped ring and the retainer includes an expanded ring-seal slot having an axial length equal to or greater than a compressed diameter of the ring seal plus an axial length of the flow gap so that the ring seal rolls within the expanded ring-seal slot when the retainer moves the ring seal into or retracts the ring seal out of the flow gap.

11. A retracting ring seal valve for adjustably restricting and permitting fluid flow, comprising:

a. a valve body that defines a central passage through which the fluid passes, a side chamber adjacent to and in fluid communication with the central passage, and a sealing shoulder around a circumference of the central passage;

b. a gate assembly secured within the valve body to adjustably move between the central passage and side chamber, the gate assembly having a ring seal surrounding a peripheral edge of a sealing surface of the gate assembly, the ring seal being adjustably moved by a retainer to seal or open a flow gap defined between the sealing surface and sealing shoulder so that whenever the ring seal seals the flow gap the gate assembly thereby contacts the sealing shoulder to restrict fluid flow through the central passage, and whenever the retainer moves the ring seal out of the flow gap the gate assembly has no contact with the sealing shoulder and moves into the side chamber to permit unrestricted flow of the fluid through the central passage; and c. an actuating assembly for moving the ring seal into and out of the flow gap and for moving the gate assembly between the central passage and side chamber, the actuating assembly including a main shaft secured to the gate assembly with an actuating end projecting out of the valve body so that rotation of the actuating end of the main shaft moves the gate assembly between the central passage and side chamber, the main shaft also defining a push-rod cavity for housing a push rod and triple-pivot push link for moving the ring seal into and out of the flow gap by exerting longitudinal force in a direction parallel to a rotational axis of the main shaft through the push rod and triple-pivot push link to the retainer, the actuating assembly also including a mechanical securing means for securing the push rod and triple-pivot push link against longitudinal movement in a direction parallel to an axis of rotation of the main shaft during rotation of the main shaft.

12. The retracting ring seal valve of claim 11, wherein the mechanical securing means comprises a latch pivotally secured to a pivot strut extending from the actuating end of the main shaft; a latch torsion spring secured between the latch and pivot strut for biasing the latch into a bore of a solenoid link that adjustably holds the triple-pivot push link and applies force to the triple-pivot push link and thereby longitudinally moves the push rod and rotates the main shaft; and a cam roller secured to the latch adjacent a cam surface secured to the valve body so that, before the main shaft rotates, the cam surface contacts the cam roller to position a pawl end of the latch out of the bore, and whenever main shaft rotates, the cam roller moves out of contact with the cam surface and the latch torsion spring forces the pawl end of the latch into the bore to secure the triple-pivot push link against movement toward the latch.

13. The retracting ring seal valve of claim 12, wherein the ring seal comprises an "O"-shaped ring and the retainer includes an expanded ring-seal slot having an axial length equal to or greater than a compressed diameter of the ring seal plus an axial length of the flow gap so that the ring seal rolls within the expanded ring-seal slot when the retainer moves the ring seal into or retracts the ring seal out of the flow gap.

14. The retracting ring seal valve of claim 12, wherein the actuating assembly further comprises a re-seal spring means for rotating the main shaft and affixed gate assembly back to a sealed position after a solenoid that has moved the solenoid link to apply force to the triple-pivot push link is de-energized.

15. The retracting ring seal valve of claim 14, wherein the re-seal spring means comprises a re-seal spring secured between a strut spring block on the pivot strut and a valve body spring block on the valve body.

* * * * *